United States Patent
Ruffner et al.

(10) Patent No.: US 10,641,696 B2
(45) Date of Patent: May 5, 2020

(54) HOLOGRAPHIC DETECTION AND CHARACTERIZATION OF LARGE IMPURITY PARTICLES IN PRECISION SLURRIES

(71) Applicant: NEW YORK UNIVERSITY, New York, NY (US)

(72) Inventors: David B. Ruffner, New York, NY (US); David G. Grier, New York, NY (US); Laura Philips, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 15/759,502

(22) PCT Filed: Sep. 15, 2016

(86) PCT No.: PCT/US2016/051946
§ 371 (c)(1),
(2) Date: Mar. 12, 2018

(87) PCT Pub. No.: WO2017/048960
PCT Pub. Date: Mar. 23, 2017

(65) Prior Publication Data
US 2018/0252628 A1 Sep. 6, 2018

Related U.S. Application Data (60) Provisional application No. 62/220,786, filed on Sep. 18, 2015.

(51) Int. Cl.
*G01N 15/02* (2006.01)
*G01N 15/14* (2006.01)
(Continued)

(52) U.S. Cl.
CPC ..... *G01N 15/0227* (2013.01); *G01N 15/1434* (2013.01); *G01N 15/1459* (2013.01);
(Continued)

(58) Field of Classification Search
CPC ............. G01N 15/0227; G01N 21/453; G01N 15/1463; G01N 15/1459; G01N 15/1434;
(Continued)

(56) References Cited

U.S. PATENT DOCUMENTS 3,069,654 A   12/1962  Hough
4,532,422 A    7/1985  Nomura et al.
(Continued)

FOREIGN PATENT DOCUMENTS

CA     1159674 A1    1/1984
EP     0 354 37 A1   9/1981
(Continued)

OTHER PUBLICATIONS

International Search Report and Written Opinion in PCT/US2016/051946, dated Nov. 28, 2016, 7 pages.
(Continued)

*Primary Examiner* — Hwa Andrew Lee
(74) *Attorney, Agent, or Firm* — Foley & Lardner LLP (57) ABSTRACT

Impurities within a sample are detected by use of holographic video microscopy. The sample flows through the microscope and holographic images are generated. The holographic image is analyzed to identify regions associated with large impurities in the sample. The contribution of the particles of the sample to the holographic images is determined and the impurities are characterized.

13 Claims, 6 Drawing Sheets

(51) Int. Cl.
    *G01N 21/45*     (2006.01)
    *G03H 1/04*     (2006.01)
    *G03H 1/00*     (2006.01)
    *G01N 15/00*     (2006.01)

(52) U.S. Cl.
CPC ....... *G01N 15/1463* (2013.01); *G01N 21/453* (2013.01); *G03H 1/0005* (2013.01); *G03H 1/0443* (2013.01); *G01N 2015/0053* (2013.01); *G01N 2015/0233* (2013.01); *G01N 2015/1454* (2013.01); *G01N 2015/1493* (2013.01); *G03H 2001/005* (2013.01); *G03H 2001/0033* (2013.01); *G03H 2001/0447* (2013.01)

(58) Field of Classification Search
CPC ... G01N 2015/1493; G01N 2015/0233; G03H 1/0005; G03H 1/0443; G03H 2001/0033; G03H 2001/005

See application file for complete search history.

(56) References Cited

U.S. PATENT DOCUMENTS

| | | |
|---|---|---|
| 4,627,729 A | 12/1986 | Breuckmann et al. |
| 4,740,079 A | 4/1988 | Koizumi et al. |
| 4,986,659 A | 1/1991 | Bachalo |
| 4,998,788 A | 3/1991 | Osakabe et al. |
| 5,095,207 A | 3/1992 | Tong |
| 5,796,498 A | 8/1998 | French |
| 5,880,841 A | 3/1999 | Marron et al. |
| 6,097,488 A | 8/2000 | Grek et al. |
| 6,214,560 B1 | 4/2001 | Yguerabide et al. |
| 6,281,994 B1 | 8/2001 | Horikoshi et al. |
| 6,480,285 B1 | 11/2002 | Hill |
| 6,519,033 B1 | 2/2003 | Quist et al. |
| 6,710,874 B2 | 3/2004 | Mavliev |
| 7,001,721 B1 | 2/2006 | Whitcombe et al. |
| 7,218,112 B2 | 5/2007 | Ladebeck et al. |
| 7,248,282 B2 | 7/2007 | Maddison |
| 7,338,168 B2 | 3/2008 | Cartlidge et al. |
| 7,532,327 B2 | 5/2009 | Bloom et al. |
| 7,839,551 B2 | 11/2010 | Lee et al. |
| 8,119,988 B2 | 2/2012 | Daido et al. |
| 8,299,789 B2 | 10/2012 | Heid et al. |
| 8,331,019 B2 | 12/2012 | Cheong et al. |
| 8,405,395 B2 | 3/2013 | Setsompop et al. |
| 8,431,884 B2 | 4/2013 | Grier |
| 8,680,861 B1 | 3/2014 | Morrone |
| 8,766,169 B2 | 7/2014 | Grier et al. |
| 8,791,985 B2 | 7/2014 | Grier et al. |
| 9,810,894 B2 | 11/2017 | Grier et al. |
| 9,897,675 B2 | 2/2018 | Setsompop et al. |
| 9,933,351 B2 | 4/2018 | Kent et al. |
| 2002/0069242 A1 | 6/2002 | Berns |
| 2003/0021382 A1 | 1/2003 | Iwanczyk et al. |
| 2004/0004716 A1 | 1/2004 | Mavliev |
| 2004/0004717 A1 | 1/2004 | Reed |
| 2004/0072372 A1 | 4/2004 | Seul et al. |
| 2005/0141757 A1 | 6/2005 | Ayache et al. |
| 2006/0127369 A1 | 6/2006 | Christensen et al. |
| 2007/0070303 A1 | 3/2007 | Yonekubo |
| 2007/0242269 A1 | 10/2007 | Trainer |
| 2008/0037004 A1 | 2/2008 | Shamir et al. |
| 2008/0150532 A1 | 6/2008 | Slavin et al. |
| 2009/0059008 A1 | 3/2009 | Ishii |
| 2009/0128825 A1 | 5/2009 | Akcakir |
| 2010/0090694 A1 | 4/2010 | Heid et al. |
| 2010/0259263 A1 | 10/2010 | Holland et al. |
| 2011/0043607 A1* | 2/2011 | Grier ................. G01N 15/0227 348/40 |
| 2011/0130348 A1 | 6/2011 | Ting et al. |
| 2011/0157599 A1 | 6/2011 | Weaver et al. |
| 2011/0292363 A1 | 12/2011 | Ivey et al. |
| 2012/0135535 A1 | 5/2012 | Grier et al. |
| 2012/0177543 A1 | 7/2012 | Battrell et al. |
| 2012/0235678 A1 | 9/2012 | Seiberlich et al. |
| 2012/0256626 A1 | 10/2012 | Adalsteinsson et al. |
| 2012/0273664 A1 | 11/2012 | Grier et al. |
| 2013/0038326 A1 | 2/2013 | Amadon et al. |
| 2013/0271135 A1 | 10/2013 | Ozen et al. |
| 2013/0278743 A1 | 10/2013 | Cheong et al. |
| 2013/0308135 A1 | 11/2013 | Dubois et al. |
| 2014/0170735 A1 | 6/2014 | Holmes |
| 2014/0177932 A1 | 6/2014 | Milne et al. |
| 2014/0253126 A1 | 9/2014 | Habara et al. |
| 2014/0313510 A1 | 10/2014 | Schmidt et al. |
| 2014/0333935 A1 | 11/2014 | Grier et al. |
| 2015/0002150 A1 | 1/2015 | Weissler et al. |
| 2015/0062587 A1 | 3/2015 | Shpaisman |
| 2015/0300963 A1 | 10/2015 | Haidekker et al. |
| 2015/0301141 A1 | 10/2015 | Griswold et al. |
| 2015/0346300 A1 | 12/2015 | Setsompop et al. |
| 2016/0116559 A1 | 4/2016 | Cohen |
| 2016/0282436 A1 | 9/2016 | Cloos |
| 2016/0291105 A1 | 10/2016 | Knoll et al. |
| 2016/0291107 A1 | 10/2016 | Rosen et al. |
| 2019/0033414 A1 | 1/2019 | Sofka et al. |
| 2019/0033415 A1 | 1/2019 | Sofka et al. |

FOREIGN PATENT DOCUMENTS

| | | |
|---|---|---|
| EP | 0 278 714 A2 | 8/1988 |
| EP | 1 855 081 A1 | 11/2007 |
| EP | 1 865 430 A2 | 12/2007 |
| JP | 55-096976 A | 7/1980 |
| JP | 03-251388 A | 11/1991 |
| JP | 03-251888 A | 11/1991 |
| JP | 2000-225302 A | 8/2000 |
| JP | 2001-034148 A | 2/2001 |
| JP | 2005-512127 A | 4/2005 |
| JP | 2007-279475 A | 10/2007 |
| JP | 2011-502256 A | 1/2011 |
| JP | 2011-525967 A | 9/2011 |
| JP | 2014-503794 A | 2/2014 |
| WO | WO-03/048868 A1 | 6/2003 |
| WO | WO-2005/027031 A2 | 3/2005 |
| WO | WO-2006/034129 A2 | 3/2006 |
| WO | WO-2008/092107 A1 | 7/2008 |
| WO | WO-2008/127410 A2 | 10/2008 |
| WO | WO-2009/059008 A1 | 5/2009 |
| WO | WO-2012/061752 | 5/2012 |
| WO | WO-2013/080164 A1 | 6/2013 |
| WO | WO-2013/126554 A1 | 8/2013 |
| WO | WO-2015/073894 A2 | 5/2015 |

OTHER PUBLICATIONS

Atherton, T.J., et al., "Size invariant circle detection", Image and Vision Computing, 1999, 17(11): 795-803.

Ballard, D.H., "Generalizing the Hough Transform to Detect Arbitrary Shapes", Pattern Recognition, 1981, 13(2):111-122.

Basim, G.B., et al., "Effect of Particle Size of Chemical Mechanical Polishing Slurries for Enhanced Polishing with Minimal Defects", Journal of the Electrochemical Society, 2000, 147(9):3523-3528.

Bishop, C.M., Neural Networks for Pattern Recognition, Dec. 31, 2015, p. 207, Oxford University Press, New York.

Boas, D.A., et al., "Scattering of diffuse photon density waves by spherical inhomogeneities within turbid media: analytic solution and applications", Proc. Natl. Acad. Sci. USA, May 1994, 91(11):4887-4891.

Bolognesi, G., et al., "Digital holographic tracking of microprobes for multipoint viscosity measurements", Optics Express, Sep. 26, 2011, 19(20):19245-19254.

Bourquard, A., et al., "A practical inverse-problem approach to digital holographic reconstruction", Optics Express, Feb. 11, 2013, 21(3):3417-3433.

Chang, C-C., et al., "LIBSVM: A Library for Support Vector Machines", ACM Transactions on Intelligent Systems and Technology, 2011, 2(3), 39 pages.

Chang, C-C., et al., "Training v-Support Vector Regression: Theory and Algorithms", Neural Computation, 2002, 14(8):1959-1977.

(56) References Cited

OTHER PUBLICATIONS

Cheong, F.C., et al., "Flow visualization and flow cytometry with holographic video microscopy", Optics Express, Jul. 20, 2009, 17(15):13071-13079.
Cheong, F.C., et al., "Holographic characterization of individual colloidal spheres' porosities", Soft Matter, 2011, 7(15):6816-6819.
Cheong, F.C., et al., "Holographic microrheology of polysaccharides from *Streptococcus mutans* biofilms", Rheologica Acta, 2009, 48(1):109-115.
Cheong, F.C., et al., "Strategies for three-dimensional particle tracking with holographic video microscopy", Optics Express, 2010, 18(13):13563-13573.
Cheong, F.C., et al., "Technical note: Characterizing individual milk fat globules with holographic video microscopy", Journal of Dairy Science, 2009, 92(1):95-99.
Chia, V.K.F., et al., "A Review of Analytical Techniques for Identifying Contaminants in the Semiconductor Industry", Journal of the IEST, 2002, 45(1):37-44.
Crocker, J.C., et al., "Methods of Digital Video Microscopy for Colloidal Studies", Journal of Colloid and Interface Science, 1996, 179(1):298-310.
Dixon, L., et al., "Holographic particle-streak velocimetry", Optics Express, Feb. 28, 2011, 19(5): 4393-4398.
Dumm, T.F., "Characterization of Low-Level, Oversize Particles in Abrasive Powders", KONA Powder and Particle Journal, 2005, 23:129-138.
Fung, J., et al., "Holographic measurements of anisotropic three-dimensional diffusion of colloidal clusters", Physical Review E, 2013, 88:020302-1-5.
Fung, J., et al., "Measuring translational, rotational, and vibrational dynamics in colloids with digital holographic microscopy", Optics Express, Apr. 25, 2011, 19(9):8051-8065.
Goodman, J.W., "Statistical Properties of Laser Speckle Patterns", Laser Speckle and Related Phenomena, 2007, pp. 9-75.
Grier, D.G., "A Revolution in Optical Manipulation", Nature, 2003, 424:810-816.
Hogg, R., "Issues in Particle Size Analysis", KONA Powder and Particle Journal, 2008, 26:81-93.
Hollitt, C., "A convolution approach to the circle Hough transform for arbitrary radius", Machine Vision and Applications, 2013, 24(4):683-694.
Hukkanen E.J., et al., "Measurement of particle size distribution in suspension polymerization using in situ laser backscattering", Sensors and Actuators B: Chemical, 2003, 96(1-2):451-459.
Ishimaru, A., "Diffusion of light in turbid material", Applied Optics, Jun. 15, 1989, 28(12):2210-2215.
Krishnatreya, B.J., et al., "Fast feature identification for holographic tracking: the orientation alignment transform", Optics Express, Jun. 2, 2014, 22(11):12773-12778.
Krishnatreya, B.J., et al., "Measuring Boltzmann's constant through holographic video microscopy of a single colloidal sphere", American Journal of Physics, 2014, 82(1):23-31.
Lee, S-H., et al., "Holographic microscopy of holographically trapped three-dimensional structures", Optics Express, Feb. 19, 2007, 15(4):1505-1512.
Lee, S-H., et al., "Characterizing and tracking single colloidal particles with video holographic microscopy", Optics Express, Dec. 24, 2007, 15(26):18275-18282.
Lee, M.H., et al., "Statistics of speckle propagation through the turbulent atmosphere", J. Opt. Soc. Am., Nov. 1976, 66(11):1164-1172.
Maret, G., et al., "Multiple Light Scattering from Disordered Media. The Effect of Brownian Motion of Scatterers", Z. Phys. B—Condensed Matter, 1987, 65(4):409-413.
Parthasarathy, R., "Rapid, accurate particle tracking by calculation of radial symmetry centers", Nature Methods, 2012, 9:724-726.
Pedregosa, F., et al., "Scikit-learn: Machine Learning in Python", Journal of Machine Learning Research, 2011, 12:2825-2830.
Pine, D.J., et al., "Diffusing-Wave Spectroscopy", Physical Review Letters, Mar. 21, 1988, 60(12):1134-1137.

Remsen, E.E., et al., "Analysis of Large Particle Count in Fumed Silica Slurries and Its Correlation with Scratch Defects Generated by CMP", Journal of the Electrochemical Society, 2006 153(5):G453-G461.
Roichman, Y., et al., "Influence of non-conservative optical forces on the dynamics of optically trapped colloidal spheres: The fountain of probability", Physical Review Letters, 2008, 101:128301, 5 pages.
Rubinstein, J., et al., "Recognition of Distorted Patterns by Invariance Kernels", Pattern Recognition, 1991, 24(10):959-967.
Savin, T., et al., "Role of a finite exposure time on measuring an elastic modulus using microrheology", Physical Review E, 2005, 71:041106-1-6.
Savin, T., et al., "Static and Dynamic Errors in Particle Tracking Microrheology", Biophysical Journal, Jan. 2005, 88(1):623-638.
Seifi, M., et al., "Fast and accurate 3D object recognition directly from digital holograms", J. Opt. Soc. Am. A, Nov. 2013, 30(11):2216-2224.
Sheng, J., et al., "Digital holographic microscope for measuring three-dimensional particle distributions and motions", Applied Optics, Jun. 1, 2006, 45(16):3893-3901.
Shpaisman, H., et al., "Holographic microrefractometer", Applied Physics Letters, 2012, 101:091102, 3 pages.
Smola, A.J., et al., "A tutorial on support vector regression", Statistics and Computing, 2004, 14(3):199-222.
Tolla, B., "Distortion of Single-Particle Optical Sensing (SPOS) Particle Count by Sub-Countable Particles", Part. Part. Syst. Charact., 2010, 27(1-2):21-31.
Xiao, K., et al., "Multidimensional optical fractionation with holographic verification", Physical Review Letters, 2010, 104:028302, 4 pages.
Yang, C., et al., "Spatial coherence of forward-scattered light in a turbid medium", J. Opt. Soc. Am. A, Apr. 1999, 16(4):866-871.
International Search Report and Written Opinion for Application PCT/US2015/015666, dated Jan. 7, 2016, 11 pages.
Extended European Search Report in EP 15792186.7, dated Dec. 14, 2017, 11 pages.
"Immunogenicity Assessment for Therapeutic Protein Products," Food and Drug Administration, 39 pages (2014).
Aspnes, "Local-field effects and effective-medium theory: A microscopic perspective," American Journal of Physics 50(8), pp. 704-709 (1982).
Ball, et al., "Complexation Mechanism of Bovine Serum Albumin and Poly(allylamine hydrochloride)," The Journal of Physical Chemistry B 106(9), pp. 2357-2364 (2002).
Basim & Moudgil, "Effect of Soft Agglomerates on CMP Slurry Performance," Journal of Colloid and Interface Science 256(1), pp. 137-142 (2002).
Ben-Eliezer, et al., "A New Model-Based Technique for Accurate Reconstruction of T2 Relaxation Maps from Fast Spin-Echo Data," Proceedings of the International Society for Magnetic Resonance in Medicine 21, p. 2453 (2013).
Carpenter, et al., "Overlooking subvisible particles in therapeutic protein products: Gaps that may compromise product quality," Journal of Pharmaceutical Sciences 98(4), pp. 1201-1205 (2009).
Chen, et al., "Magnetic resonance fingerprinting (MRF) for rapid quantitative abdominal imaging", Proceedings of the International Society of Magnetic Resonance in Medicine 22, p. 561 (2014).
Cheong & Grier, "Rotational and translational diffusion of copper oxide nanorods measured with holographic video microscopy," Optics Express 18(7), pp. 6555-6562 (2010).
Cloos, et al., "Plug and Play Parallel Transmission at 7 and 9.4 Tesla Based on Principles from MR Fingerprinting," Proceedings of the International Society for Magnetic Resonance in Medicine 22, p. 0542 (2014).
Colomb, et al., "Polarization microscopy by use of digital holography: application to optical-fiber birefringence measurements," Applied Optics 44(21), pp. 4461-4469 (2005).
Costantino, et al., "Moisture-Induced Aggregation of Lyophilized Insulin," 11(1), pp. 21-29 (1994).
Demeule, et al., "Characterization of Particles in Protein Solutions: Reaching the Limits of Current Technologies," The AAPS Journal 12(4), pp. 708-715 (2010).

(56) References Cited

OTHER PUBLICATIONS

Den Engelsman, et al., "Strategies for the Assessment of Protein Aggregates in Pharmaceutical Biotech Product Development," Pharmaceutical Research 28(4), pp. 920-933 (2011).
Denis, et al., "Direct Extraction of the Mean Particle Size from a Digital Hologram," Applied Optics 45(5), pp. 944-952 (2006).
Dixon, et al., "Holographic deconvolution microscopy for high-resolution particle tracking," Optics Express 19(17), pp. 16410-16417 (2011).
Doneva, M., et al., "Compressed Sensing Reconstruction for Magnetic Resonance Parameter Mapping", Magnetic Resonance in Medicine, 2010, 64:1114-1120.
Examination Report for European Patent App. No. 16169799.0, dated Jul. 24, 2017, 5 pages.
Extended European Search Report for European Patent App. No. 08844591.1, dated Nov. 5, 2011, 7 pages.
Extended European Search Report for European Patent App. No. 10749072.4, dated Feb. 15, 2018, 12 pages.
Extended European Search Report for European Patent App. No. 15152531.8, dated Mar. 20, 2015, 4 pages.
Extended European Search Report for European Patent App. No. 15811077.5, dated Apr. 12, 2018, 11 pages.
Extended European Search Report for European Patent App. No. 15858793.1, dated Jul. 11, 2018, 10 pages.
Extended European Search Report for European Patent App. No. 16169799.0, dated Aug. 18, 2016, 7 pages.
Feder, et al,. "Scaling Behavior and Cluster Fractal Dimension Determined by Light Scattering from Aggregating Proteins," Physical Review Letters 53(15), pp. 1403-1406 (1984).
Fifth Office Action for Chinese Patent App. No. 201080009712.X, dated Mar. 11, 2015, 17 pages (with translation).
Filipe, et al., "Critical Evaluation of Nanoparticle Tracking Analysis (NTA) by NanoSight for the Measurement of Nanoparticles and Protein Aggregates," Pharmaceutical Research 27(5), pp. 796-810 (2010).
First Office Action for Chinese Patent App. No. 201080009712.X, dated Dec. 18, 2012, 15 pages (with translation).
Fung & Manoharan, "Holographic measurements of anisotropic three-dimensional diffusion of colloidal clusters," Physical Review E 88(2), 020302(R), 9 pages (2013).
Fung, et al., "Imaging multiple colloidal particles by fitting electromagnetic scattering solutions to digital holograms," Journal of Quantitative Spectroscopy and Radiative Transfer 113(18), pp. 2482-2489 (2012).
Goller, et al., "Inorganic "silicone oil" microgels," Colloids and Surfaces A: Physicochemical and Engineering Aspects 123-124, pp. 183-193 (1997).
Graesslin, et al., "Fully Integrated Whole Body 3T MRI System for Parallel RF Transmission," Proceedings of the International Society for Magnetic Resonance in Medicine 15, p. 1007 (2007).
Graesslin, et al., "Whole Body 3T MRI System with Eight Parallel RF Transmission Channels," Proceedings of the International Society for Magnetic Resonance in Medicine 14, p. 129 (2006).
Grier, "Downloadable holographic microscopy software written in IDL, the Interactive Data Language," retrieved from http://physics.nyu.edu/grierlab/software.html, 3 pages (2014).
Hagiwara, et al., "Fractal Analysis of Aggregates Formed by Heating Dilute BSA Solutions Using Light Scattering Methods," Bioscience, Biotechnology, and Biochemistry 60(11), pp. 1757-1763 (1996).
Haist, et al., "Using Graphics Boards to Compute Holograms," Computing in Science & Engineering 8, pp. 8-13 (2006).
Hannel, et al., "Holographic characterization of imperfect colloidal spheres," Applied Physics Letters 107(14), 141905, 4 pages (2015).
Hillman, et al., "Microscopic particle discrimination using spatially-resolved Fourier-holographic light scattering angular spectroscopy," Optics Express 14(23), pp. 11088-11102 (2006).
Holm, et al., "Aggregation and fibrillation of bovine serum albumin," Biochimica et Biophysica ACTA (BBA)—Proteins and Proteomics 1774(9), pp. 1128-1138 (2007).

International Search Report and Written Opinion for PCT/US2015/037472, dated Sep. 23, 2015, 9 pages.
International Search Report and Written Opinion for PCT/US2015/055154, dated Jan. 7, 2016, 11 pages.
International Search Report and Written Opinion for PCT/US2015/060183, dated Feb. 2, 2016, 9 pages.
International Search Report and Written Opinion for PCT/US2017/016857 dated Jun. 9, 2017, 13 pages.
Jones, et al., "Silicone oil induced aggregation of proteins," Journal of Pharmaceutical Sciences 94(4), pp. 918-927 (2005).
Kao & Verkman, "Tracking of single fluorescent particles in three dimensions: use of cylindrical optics to encode particle position," Biophysical Journal 67(3), pp. 1291-1300 (1994).
Katscher, et al., "Parallel RF transmission in MRI," NMR in Biomedicine 19(3), pp. 393-400 (2006).
Katscher, et al., "RF encoding using a multielement parallel transmit system," Magnetic Resonance in Medicine 63(6), pp. 1463-1470 (2010).
Knoll, et al., "Simultaneous MR-PET Reconstruction Using Multi Sensor Compressed Sensing and Joint Sparsity," Proceedings of the International Society for Magnetic Resonance in Medicine 22, p. 0082 (2014).
Kolomenkin, et al., "Geometric Voting Algorithm for Star Trackers," IEEE Transactions on Aerospace and Electronic Systems 44(2), pp. 441-456 (2008).
Kosters, et al., "EMRECON: An expectation maximization based image reconstruction framework for emission tomography data," 2011 IEEE Nuclear Science Symposium Conference Record, pp. 4365-4368 (2011).
Li, et al., "Understanding Stober Silica's Pore Characteristics Measured by Gas Adsorption," Langmuir 31(2), pp. 824-832 (2015).
Ma, et al., "Magnetic resonance fingerprinting", Nature 495, pp. 187-193 (2013).
Malitson, "Interspecimen Comparison of the Refractive Index of Fused Silica," Journal of the Optical Society of America 55(10), pp. 1205-1209 (1965).
Maschke, et al., "Micronization of Insulin by High Pressure Homogenization," Pharmaceutical Research 23(9), pp. 2220-2229 (2006).
Meakin, "Fractal Aggregates", Advances in Colloid and Interface Science 28, pp. 249-331 (1988).
Moreno, et al., "Particle positioning from charge-coupled device images by the generalized Lorenz-Mie theory and comparison with experiment," Applied Optics 39(28), pp. 5117-5124 (2000).
Moyses, et al., "Robustness of Lorenz-Mie microscopy against defects in illumination," Optics Express 21(5), pp. 5968-5973 (2013).
Mueller, et al., "The Alzheimer's Disease Neuroimaging Initiative," Neuroimaging Clinics of North America 15(4), pp. 869-877 (2005).
Nebrensky, et al., "A Particle Imaging and Analysis System for Underwater Holograms," Optical Methods and Data Processing in Heat and Fluid Flow, pp. 79-92 (2002).
Nelles, et al., "Dual-Source Parallel RF Transmission for Clinical MR Imaging of the Spine at 3.0 T: Intraindividual Comparison with Conventional Single-Source Transmission," Radiology 257(3), pp. 743-753 (2010).
Notice of Reasons for Refusal for Japanese Patent App. No. 2010-531335 dated Oct. 18, 2012, 6 pages (with translation).
Notice of Reasons for Refusal for Japanese Patent App. No. 2011-546331 dated Oct. 25, 2012, 6 pages (with translation).
Notice of Reasons for Refusal for Japanese Patent App. No. 2016-575179 dated Jan. 10, 2019, 9 pages (with translation).
Obey & Vincent, "Novel Monodisperse "Silicone Oil"/Water Emulsions," Journal of Colloid and Interface Science 163(2), pp. 454-463 (1994).
Office Action for Chinese Patent App. No. 200880114008.3 dated Jul. 18, 2013, 25 pages (with translation).
Office Action for Chinese Patent App. No. 201410471610.X dated Mar. 22, 2016, 21 pages (with translation).
Omichi, et al., "Fabrication of enzyme-degradable and size-controlled protein nanowires using single particle nano-fabrication technique," Nature Communications 5, 3718, 8 pages (2014).

(56) References Cited

OTHER PUBLICATIONS

Orzada, et al., "Design and comparison of two eight-channel transmit/receive radiofrequency arrays for in vivo rodent imaging on a 7 T human whole-body MRI system," Medical Physics 37(5), pp. 2225-2232 (2010).
Pan, et al., "Three-Dimensional Particle Tracking for Dilute Particle-Liquid Flows in a Pipe," Measurement Science and Technology 13(8), pp. 1206-1216 (2002).
Panchal, et al., "Analyzing Subvisible Particles in Protein Drug Products: a Comparison of Dynamic Light Scattering (DLS) and Resonant Mass Measurement (RMM)," The AAPS Journal 16(3), pp. 440-451 (2014).
Pawashe & Sitti, "Two-dimensional vision-based autonomous microparticle manipulation using a nanoprobe," Journal of Micromechatronics 3(3-4), pp. 285-306 (2006).
Perry, et al., "Real-space studies of the structure and dynamics of self-assembled colloidal clusters," Faraday Discussions 159, pp. 211-234 (2012).
Quick, "Integrated PET/MR," Journal of Magnetic Resonance Imaging 39(2), pp. 243-258 (2014).
Rappaz, et al., "Erythrocytes volume and refractive index measurement with a digital holographic microscope," Proceedings vol. 6445: Optical Diagnostics and Sensing VII, 644509, 5 pages (2007).
Rappaz, et al., "Simultaneous cell morphometry and refractive index measurement with dual-wavelength digital holographic microscopy and dye-enhanced dispersion of perfusion medium," Optics Letters 33(7), pp. 744-746 (2008).
Ripple & Dimitrova, "Protein particles: What we know and what we do not know," Journal of Pharmaceutical Sciences 101(10), pp. 3568-3579 (2012).
Schellekens, "Bioequivalence and the immunogenicity of biopharmaceuticals," Nature Reviews Drug Discovery 1, pp. 457-462 (2002).
Sciammarella & Sciammarella, "Measurement of mechanical properties of materials in the micrometer range using electronic holographic moire," Optical Engineering 42(5), 8 pages (2003).
Singh, et al., "An industry perspective on the monitoring of subvisible particles as a quality attribute for protein therapeutics," Journal of Pharmaceutical Sciences 99(8), pp. 3302-3321 (2010).
Siposova, et al., "Depolymerization of insulin amyloid fibrils by albumin-modified magnetic fluid," Nanotechnology 23(5), 055101, 10 pages(2012).
Sluzky, et al., "Kinetics of insulin aggregation in aqueous solutions upon agitation in the presence of hydrophobic surfaces," Proceedings of the National Academy of Sciences 88(21), pp. 9377-9381 (1991).
Sorensen, "Light Scattering by Fractal Aggregates: A Review," Aerosol Science and Technology 35(2), pp. 648-687 (2001).
Strzodka, et al., "Real-Time Motion Estimation and Visualization on Graphics Cards," IEEE Visualization 2004, pp. 545-552 (2004).
Voros, et al., "The Density and Refractive Index of Adsorbing Protein Layers," Biophysical Journal 87(1), pp. 553-561 (2004).
Wang, "Protein aggregation and its inhibition in biopharmaceutics," International Journal of Pharmaceutics 289(1-2), pp. 1-30 (2005).
Wang, et al., "Celebrating Soft Matter's 10th Anniversary: Monitoring colloidal growth with holographic microscopy," Soft Matter 11(6), pp. 1062-1066 (2015).
Wang, et al., "Holographic characterization of protein aggregates," Journal of Pharmaceutical Sciences 105(3), pp. 1074-1085 (2016).
Wang, et al., "Stimulus-responsive colloidal sensors with fast holographic readout," Applied Physics Letters 107(5), 051903, 5 pages (2015).
Wang, et al., "Using the discrete dipole approximation and holographic microscopy to measure rotational dynamics of non-spherical colloidal particles," Journal of Quantitative Spectroscopy and Radiative Transfer 146, pp. 499-509 (2014).
Weber, et al., "A novel 8-channel transceive volume-array for a 9.4T animal scanner," Proceedings of the International Society for Magnetic Resonance in Medicine 16, p. 151 (2008).
Weinbuch, et al., "Micro-Flow Imaging and Resonant Mass Measurement (Archimedes)—Complementary Methods to Quantitatively Differentiate Protein Particles and Silicone Oil Droplets," Journal of Pharmaceutical Sciences 102(7), pp. 2152-2165 (2013).
Witten & Sander, "Diffusion-Limited Aggregation, a Kinetic Critical Phenomenon," Physical Review Letters 47(19), pp. 1400-1403 (1981).
Written Opinion for Singapore Patent App. No. 11201802181R dated Mar. 28, 2019, 7 pages.
Wu, et al., "Synthesis of mesoporous silica nanoparticles," Chemical Society Reviews 42(9), pp. 3862-3875 (2013).
Ye, et al., "Accelerating Magnetic Resonance Fingerprinting (MRF) Using t-Blipped Simultaneous Multislice (SMS) Acquisition", Magnetic Resonance in Medicine 75(5), pp. 2078-2085 (2016).
Yevick, et al., "A machine-learning approach to holographic particle characterization," Optics Express 22(22), pp. 26884-26890 (2014).
Yip, et al., "Atomic Force Microscopy of Crystalline Insulins: The Influence of Sequence Variation on Crystallization and Interfacial Structure," Biophysical Journal 74(5), pp. 2199-2209 (1998).
Yip, et al., "Structural and Morphological Characterization of Ultralente Insulin Crystals by Atomic Force Microscopy: Evidence of Hydrophobically Driven Assembly," Biophysical Journal 75(3), pp. 1172-1179 (1998).
Zolls, et al., "How subvisible particles become invisible—relevance of the refractive index for protein particle analysis," Journal of Pharmaceutical Sciences 102(5), pp. 1434-1446 (2013).
Siler, D.J., et al., "Measurement of Protein in Natural Rubber Latex", Analytical Biochemistry, 1995, 229(2):278-281.
Extended European Search Report in EP 17750639.1, dated Jan. 16, 2020, 13 pages.

* cited by examiner

HOLOGRAPHIC DETECTION AND CHARACTERIZATION OF LARGE IMPURITY PARTICLES IN PRECISION SLURRIES

CROSS-REFERENCE TO RELATED APPLICATIONS

This application is the U.S. national phase application under 35 U.S.C. § 371 of International Application No. PCT/US2016/051946 filed Sep. 15, 2016, which claims priority benefit of U.S. Provisional Application No. 62/220,786 filed Sep. 18, 2015, both incorporated herein by reference in their entirety.

BACKGROUND OF THE INVENTION

Slurries of oxide nanoparticles have widespread applications as polishing and lapping agents for photonics and for chemical mechanical planarization (CMP) of microelectronic devices. The presence of aggregates or other oversize contaminants in CMP slurries is highly undesirable because of their adverse effect on surface quality, even at part-per-billion concentrations. Efforts to prevent aggregation and eliminate contaminants are hampered by a lack of techniques for detecting and characterizing comparatively small numbers of large particles in an ocean of nanoparticles. Direct imaging, laser occultation and light-scattering techniques, for example, are ruled out by the slurries' turbidity and by the lack of contrast between the nanoparticles and the larger contaminants. Conventional particle counters are clogged and fouled by slurry particles at full concentration. Remedying these problems by dilution is impractical both because of the very large volume of fluid that then would have to be analyzed and also because the process of dilution can influence aggregation processes that might be of interest.

SUMMARY OF THE INVENTION

One embodiment relates to a method of characterizing impurities in a sample. The method comprises flowing the sample through an observation volume of a holographic microscope, generating a first holographic image based upon holographic video microscopy of the sample within the observation volume at a first time, analyzing the first holographic image for one or more regions of interest corresponding to a particle of interest, normalizing the region of interest for a contribution of a diffuse wave created by interaction of light with the sample, fitting the normalized region of interest to a light scattering theory, and characterizing one or more properties of the particle of interest.

Another embodiment relates to a method of characterizing particles of interest in a slurry. The method comprises flowing the slurry through an observation volume of a holographic microscope, generating a first holographic image based upon holographic video microscopy of the sample within the observation volume at a first time, analyzing the first holographic image, applying Lorenz Mie analysis to the holographic image and characterizing the particle of interest.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE PREFERRED EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are systems and methods of in-line holographic video microscopy. Embodiments of the in-line holographic video microscopy systems and methods addresses the need by identifying large inclusions in commercial slurries at full concentration, and yielding accurate information on their numbers, sizes and compositions. In one embodiment, the slurry consists of silicon dioxide nanoparticles with characteristic dimensions of 70 nm dispersed in water at a volume fraction of 30.9%. Such a slurry is turbid, and so differs qualitatively from the optically transparent media that have been considered in prior art implementations of holographic particle characterization. An inclusion of interest is substantially larger than a slurry particle and has an index of refraction that differs from that of the fluid medium. In one embodiment, an inclusion particle consists of an oversized impurity particle with a characteristic dimension of one micrometer. In another embodiment, an inclusion particle consists of an aggregate formed from multiple slurry particles that have become rigidly attached to each other. The slurry is a "scattering fluid" as pertains to the application of holographic video microscopy, resulting in a scattering signal in addition to that of any particles of interest in a sample volume that is imaged.

It is further believed that in certain embodiments, both the relative size and refractive index of the particles of interest, such as impurities, compared to the slurry (specifically, the suspended particles of the slurry) contribute to the ability to detect the particles of interest. A larger scattering by the particles of interest than the slurry particles will allow for detection of particles of interest of smaller size relative to the slurry particles. Similarly, if the background slurry particles scatter more than the particles of interest, the particles of interest will need to be larger, relative to the slurry particles, for detection.

Figure 1:
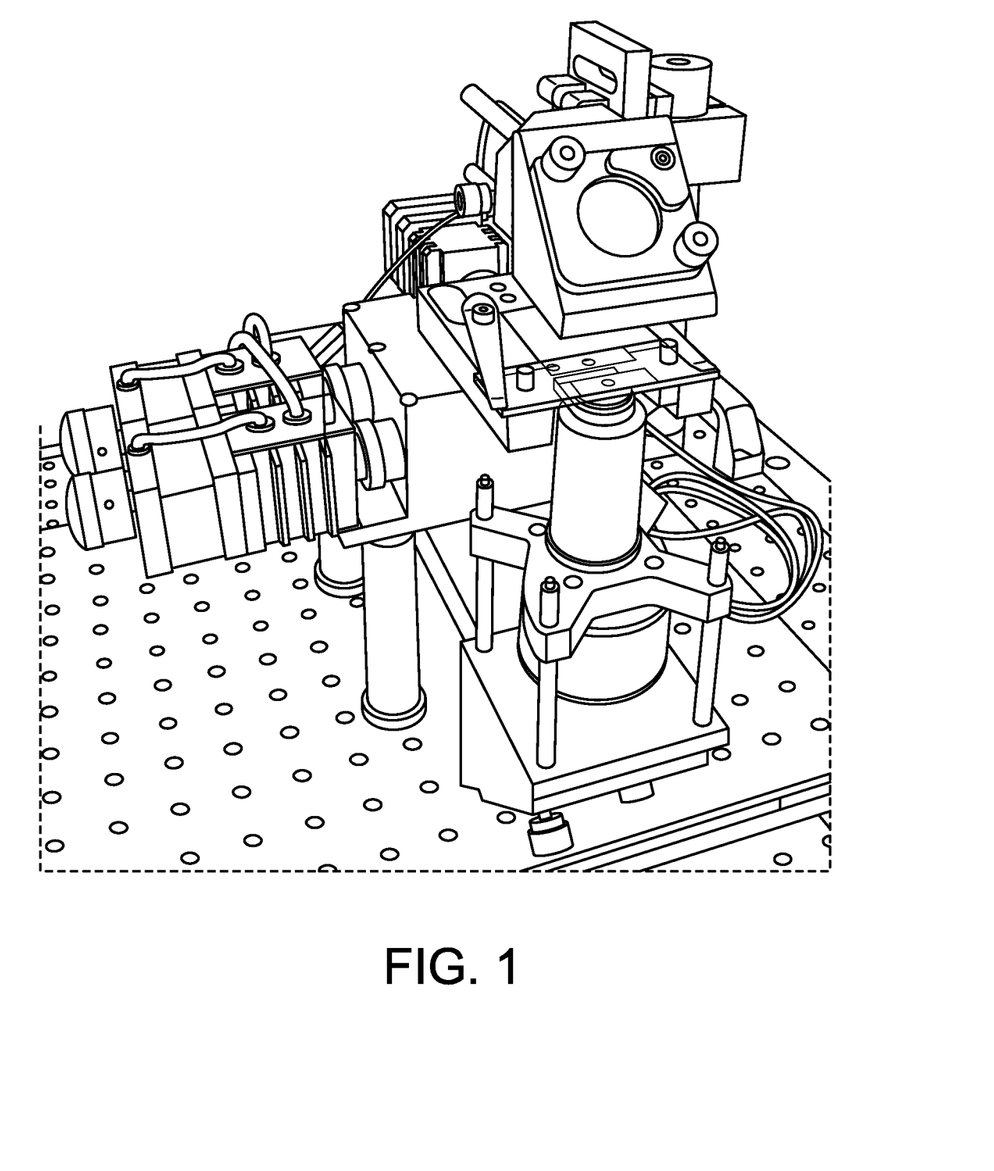
FIG. 1 Photograph of the in-line holographic video microscope used to characterize oversize particles in CMP slurries.

FIG. 1 illustrates one embodiment of a holographic measurement system that illuminates the sample with the collimated beam. The embodiment illustrated uses a fiber coupled diode laser operating at a vacuum wavelength of 532 nm. Light scattered by colloidal particles interferes with the remainder of the beam in the focal plane of a microscope objective lens, which relays the magnified interference pattern to a conventional video camera, in the illustrated embodiment with an effective magnification of 47 nm/pixel. The slurry flows through the laser beam in a standard microfluidic channel mounted on the microscope's stage.

The flow rate is chosen to be fast enough that a specified volume of the sample can be analyzed in a specified measurement duration, but not so fast that motion appreciably blurs the hologram during the exposure time of the video camera. The maximum usable flow rate is inversely proportional to the exposure time. The minimum usable exposure time is determined by the intensity of the illumination laser and by the sensitivity and noise characteristics of the camera. The combination of laser intensity and exposure time is chosen to ensure that the signal-to-noise ratio of recorded holograms is high enough to obtain reliable results from the holographic characterization analysis. This, in turn, determines the maximum usable flow rate for the sample, and the time required to characterize a specified volume of sample. In one embodiment, a peak flow speed of 100 micrometers per second suffices to detect and characterize the properties of 1000 oversized impurity particles dispersed in a CMP slurry at a part-per-billion concentration in a ten-minute measurement period. A series of holographic images of the sample is captured as frames in a digital video. In the illustrated embodiment, each 1280 pixel×1024 pixel video frame is a hologram of the particles in the 60 µm×48 µm×20 µm observation volume. Holograms obtained in comparable systems have been interpreted with predictions of the Lorenz-Mie theory of light scattering to obtain precise measurements of individual colloidal spheres' sizes and refractive indexes. Although the large concentration of nanoparticles in a typical CMP slurry contributes a random background to the recorded holograms, embodiments surprisingly find that Lorenz-Mie analysis still yields accurate and precise measurements of the properties of individual micrometer-scale contaminant particles.

Particles of interest (often contaminants) typically are larger than the particles that constitute the slurry. The largest such contaminant particle that can be characterized by this technique depends on the configuration of the holographic recording instrument. In one embodiment, the accessible range of sizes runs from 200 nanometers to 20 micrometers. Because this is a particle-resolved measurement technique, moreover, holographic characterization can detect and count rare particles.

Figure 2A:
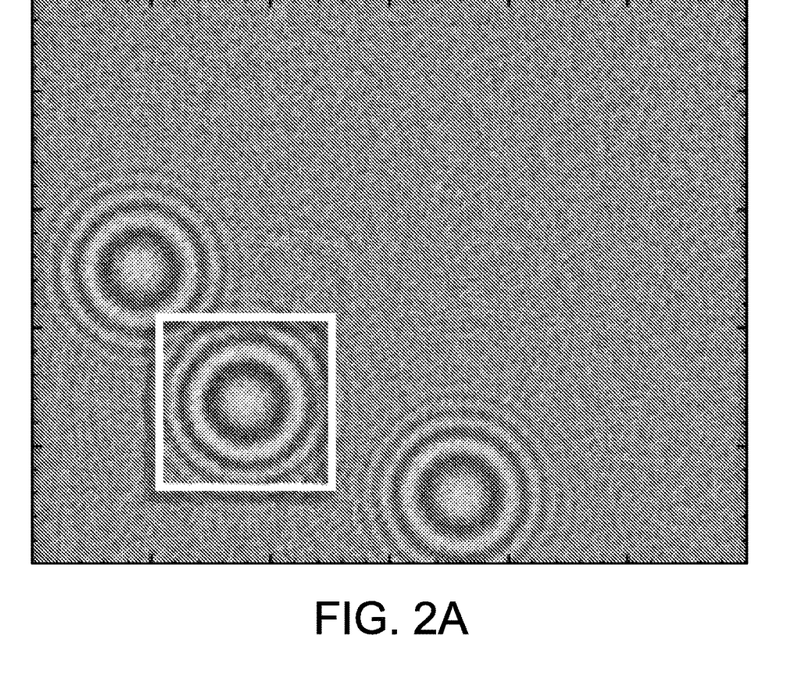
FIG. 2(a) Experimentally recorded hologram of a CMP slurry containing impurity particles at part-per-billion concentration. This image displays three clear features due to light scattering by the micrometer-scale spheres.

To demonstrate this technique and verify its efficacy, a well-characterized commercial CMP slurry (Dow Ultrasol 2EX) consisting of silica nanoparticles with a nominal diameter of 70 nm was seeded with colloidal silica spheres (Bangs Laboratories, Catalog Number SS04N, Lot Number 5303). The 1.5 micrometer-diameter silica spheres contribute clearly visible bulls-eye features to the hologram in FIG. 2(a). These features were detected using an image-analysis filter that emphasizes centers of rotational symmetry and then selects the surrounding region for analysis. One embodiment utilizes the analysis technique described in PCT/US2015/015666, incorporated herein by reference. Specifically, the orientation-alignment transform is used to detect features of interest. It is possible to perform the actual fitting using the standard technique, essentially ignoring the presence of the slurry. Surprisingly, the values obtained in this way are reasonably close to the independently verified properties of the particles.

Figure 2B:
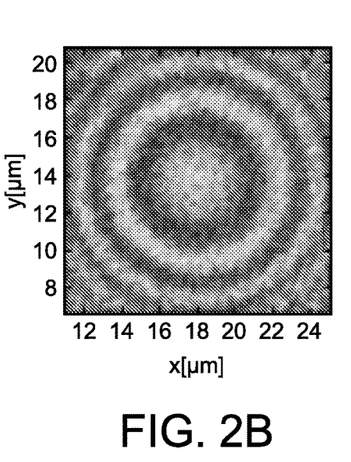
FIG. 2(b) Region of interest around the feature due to a single sphere.

However, in another embodiment the analysis considers the slurry and accounts for it. Equations (2b) and (4b) below are novel approaches to accomplish this, and yield values for particle characteristics that experimentally have been confirmed to be accurate. FIG. 2(b) shows a typical feature detected in this way.

An ideal hologram for holographic particle characterization results from the superposition of a coherent collimated beam with the light scattered out of the beam by an illuminated particle. When the particle is embedded in a nanoparticle slurry, both the illumination and the scattered wave are attenuated by multi-particle light scattering, and the resulting diffuse wave contributes time-dependent speckle to the recorded hologram. This random-scattering contribution has not been considered in previous applications of holographic particle characterization, including those for which random scattering might conceivably have played a role. These additional effects can be accounted for provided that the coherent interference pattern contributes measurably to the overall intensity distribution.

The incident field is first modeled as a monochromatic plane wave propagating along $\hat{z}$ and linearly polarized along $\hat{x}$, $$E_0(r) = u_0(r) e^{-\kappa(D-z)} e^{ikz} \hat{x}, \quad (1)$$

where $u_0(r)$ is the transverse amplitude profile and $k = 2\pi n_m/\lambda$ is the wavenumber of light with vacuum wavelength $\lambda$ propagating through a medium of refractive index $n_m$. Scattering by the slurry attenuates this beam with an effective penetration depth $\kappa_{-1}$ that depends on the concentration of slurry particles and on their light-scattering characteristics. If the channel thickness, D, is much greater than the attenuation depth, then the recorded hologram will be dominated by diffuse scattering and no information will be retained about the properties of the particle. In this formulation, the imaging plane is located at z=0 and light enters the slurry at the top of the channel, which is located at z=D.

The same scattering process that attenuates the incident light also creates a diffuse light field, $E_d(r, t)$, some of which propagates toward the imaging plane. The diffuse field gives rise to the speckle pattern in dynamic light scattering and diffusing wave spectroscopy. It evolves with depth into the slurry both because more light from the incident wave is scattered into the random field and also because the random field itself is scattered. It evolves in time as the particles rearrange themselves in the slurry. In one embodiment, the time-dependent part of the signal is analyzed to obtain information about the slurry itself. This could include information about the particle-size distribution and the concentration of slurry particles. As described above, the time dependent information can be used to calibrate the diffuse background intensity that is used to analyze the large-particle hologram. Polarization and phase randomization in the diffuse beam tend to suppress interference with the unscattered beam. In the absence of particles, therefore, the intensity in the focal plane is approximately $$I_0(r, t) = |E_0(r) + E_d(r, t)|^2 \quad (2a)$$

$$\approx u_0^2(r)e^{-2\kappa D} + |E_d(r, t)|^2, \quad (2b)$$

Further assuming the speckle pattern to have Gaussian statistics, Eq. (2) can be used to obtain independent estimates for the unscattered amplitude $u_0(r) \exp(-\kappa D)$ and the diffuse field's time-averaged amplitude, $u_d = \langle |E_d(r, t)| \rangle_t$, from video sequences, $I_0(r, t)$, of the flowing slurry.

Both the attenuated illumination and the diffuse scattered field are incident on a sphere at height $z_p$ above the imaging plane. As before, it is assumed that light coherently scattered from the illumination contributes more to the recorded hologram than light scattered out of the diffuse field. This condition can be ensured by appropriately reducing the channel depth, D, to the greatest extent consistent with maintaining the desired flow characteristics and measurement duration. The scattered field at point r in the imaging plane therefore is approximately given by $$E_s(r) \approx u_0(r_p)e^{-\kappa D}f_s(k(r-r_p)) \quad (3)$$

where $f_s(kr)$ is the Lorenz-Mie scattering function that describes how an $\hat{x}$-polarized plane wave is scattered by a sphere of radius $a_p$ and refractive index $n_p$. Equation (3) accounts for the illumination's attenuation before reaching the particle, and the further attenuation of the scattered wave as it propagates to the focal plane. For simplicity, we model this latter effect as a single exponential factor, which neglects the optical path length's dependence on scattering angle.

Figures 2C, 2D:
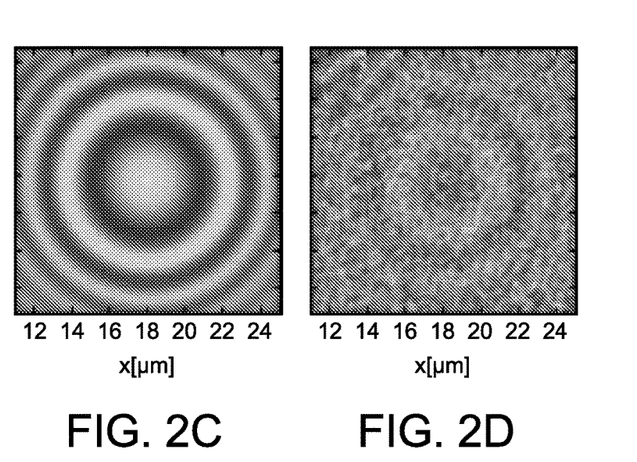
FIG. 2(c) Fit to predictions of the theory of holographic particle characterization.
FIG. 2(d) Residual image, showing only the background due to nanometer-scale slurry particles.

The hologram in FIG. 2(c) is obtained from the intensity of the field in the imaging plane, $$I(r) = |E_0(r) + E_s(r) + E_d(r, t)|^2 \quad (4a)$$

$$\approx u_0^2(r)e^{-2\kappa D}|\hat{x} + e^{ikz_p}f_s(k(r-r_p))|^2 + |E_d(r, t)|^2. \quad (4b)$$

This result omits terms that describe interference between coherent and diffuse waves, whose time average should vanish. In this model, the overall effect of the slurry is to reduce the contrast of the target particle's hologram, and to contribute Gaussian additive noise, both of which reduce the hologram's effective signal to noise ratio but do not otherwise affect its symmetries.

The diffuse wave's contribution to the measured hologram can be quantified through analysis of video sequences that do not contain holograms of particles. The first term in Eq. (4b) suggests that the quality of information that can be retrieved from the hologram is controlled by the channel thickness D. Indeed, if D is much larger than the slurry's attenuation length, the scattering particle's hologram will be entirely obscured by diffuse scattering, and other methods would be required even to detect the sphere's presence. It should be appreciated that sample cell may be selected based on the desired channel thickness.

Figure 3:
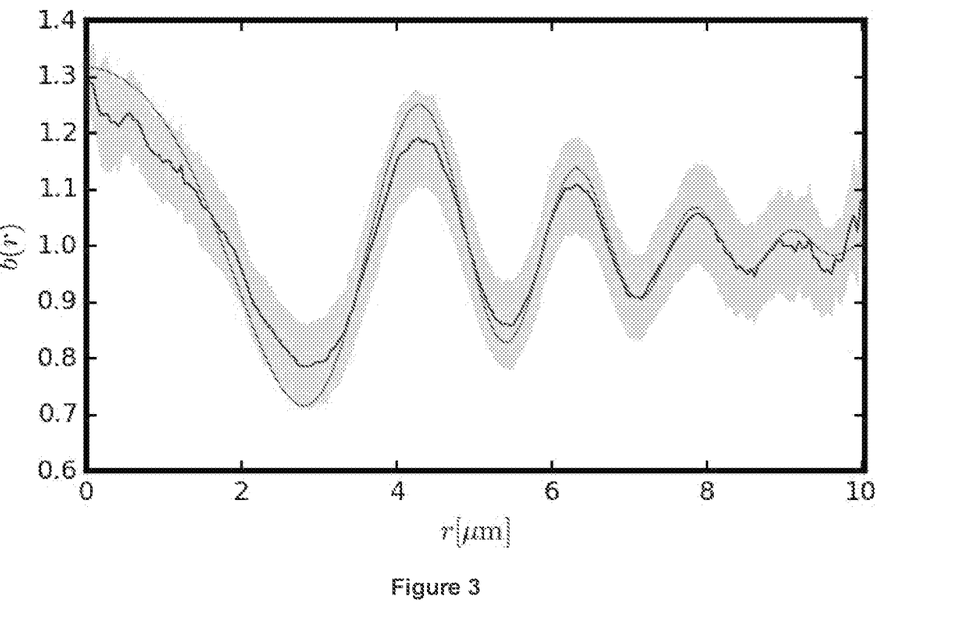
FIG. 3 Radial profile of the fit to the data in FIG. 2(b). The shaded region indicates the statistical uncertainty in the estimated radial intensity profile, which is denoted by the darker curve. The lighter curve is the fit result.

The image in FIG. 2(d) results from the nonlinear least-squares fit of Eq. (4) to the data in FIG. 2(c). The difference between the measured and fit holograms is plotted in FIG. 2(d). The particle's radius obtained from this fit, $a_p=0.749\pm0.006$ μm, is consistent with the manufacturer's specification, and the refractive index, $n_p=1.439\pm0.002$, is consistent with values obtained for the same sample of silica spheres under ideal imaging conditions. The quality of the fit may be judged from the radial profile, plotted in FIG. 3, which tracks the experimental data to within random contributions due to the slurry particles, which are indicated by the shaded region.

Figure 4A:
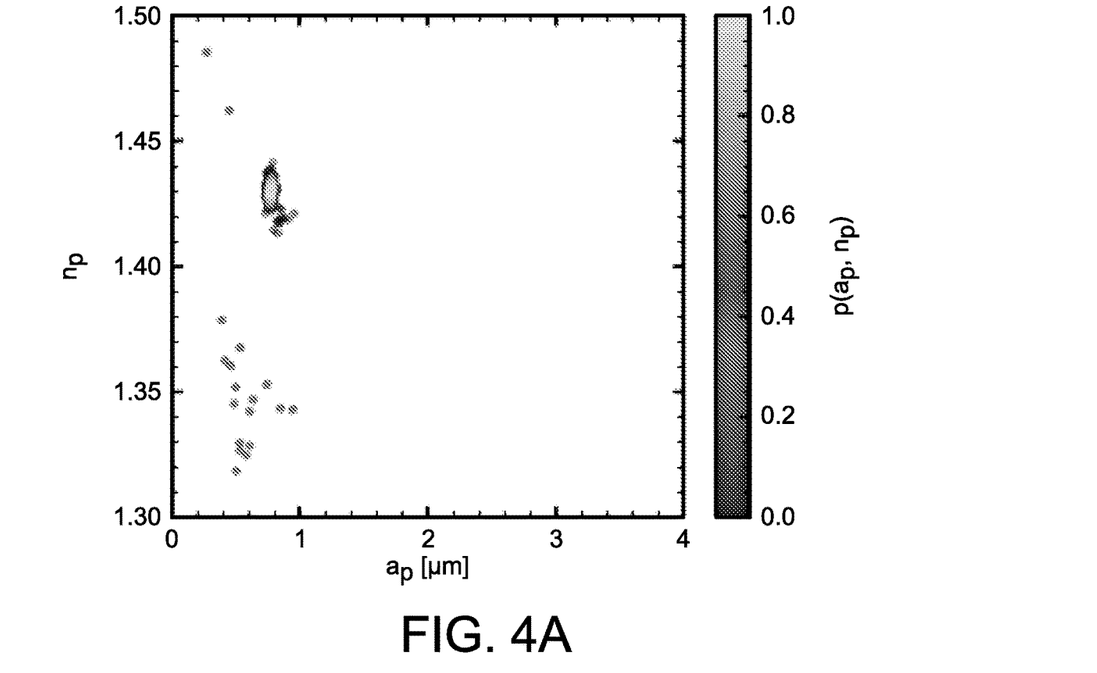
FIG. 4A Joint distribution of size and refractive index for colloidal silica spheres dispersed in water.

FIG. 4A shows a compilation of 875 single-particle measurements of the radii and refractive indexes of silica spheres from the same monodisperse sample. Each data point in the plot reflects the measured properties of a single sphere and is colored by the relative probability $\rho(a_p, n_p)$ of measurements in the $(a_p, n_p)$ plane. The mean radius, $a_p=0.79\pm0.01$ μm, agrees with the manufacturer's specification. The mean refractive index, $n_p=1.45\pm0.01$, is slightly smaller than the value 1.485 for bulk silica at the imaging wavelength, and is consistent with the spheres' having a 2% porosity, as has been discussed elsewhere. The data for this plot was acquired in 10 min.

Figure 4B:
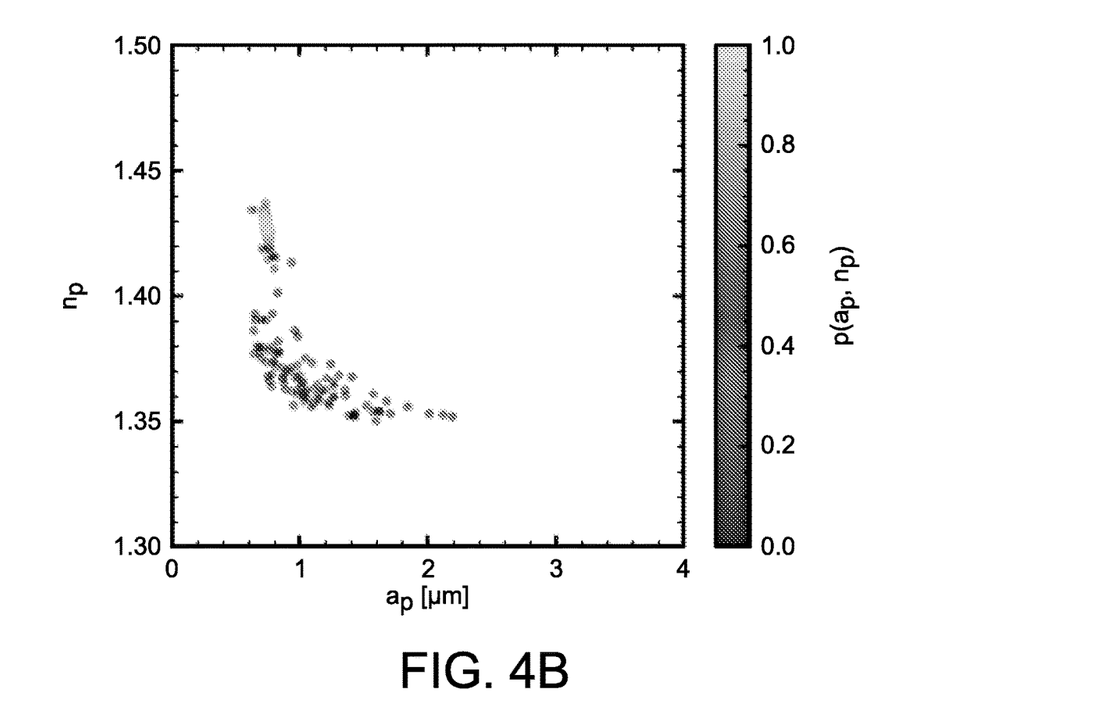
FIG. 4B Comparable result for the same sample of spheres dispersed in a slurry of silica nanoparticles.

FIG. 4B shows comparable results for the same batch of silica spheres dispersed in the silica slurry. Values for the radius, refractive index and porosity are consistent with those obtained under ideal imaging conditions. This result demonstrates that holographic particle characterization can yield accurate and precise results for the properties of micrometer-scale colloidal particles dispersed in nanoparticle slurries at full concentration.

Applying this technique to the stock solution of silica slurry yielded no detectable features after 30 min. More than $2 \times 10^9$ silica nanoparticles would have passed through the observation in that time, demonstrating that the slurry is free from detectable contaminants at the part-per-billion level. The lower limit on the detectable concentration of oversize impurity particles is set by the flow rate and the duration of the measurement. Longer measurements at higher flow rates permit detection of smaller concentrations of impurity particles. For additional analysis, aggregation was deliberately induced by freezing it and then thawing the slurry sample for analysis. The destabilized slurry now features a large number of micrometer-scale objects, which the system and methods described herein detected as nanoparticle aggregates. These aggregates are drawn from a very broad size distribution, with a sizable percentage of particles with dimensions exceeding 5 μm.

Figure 5:
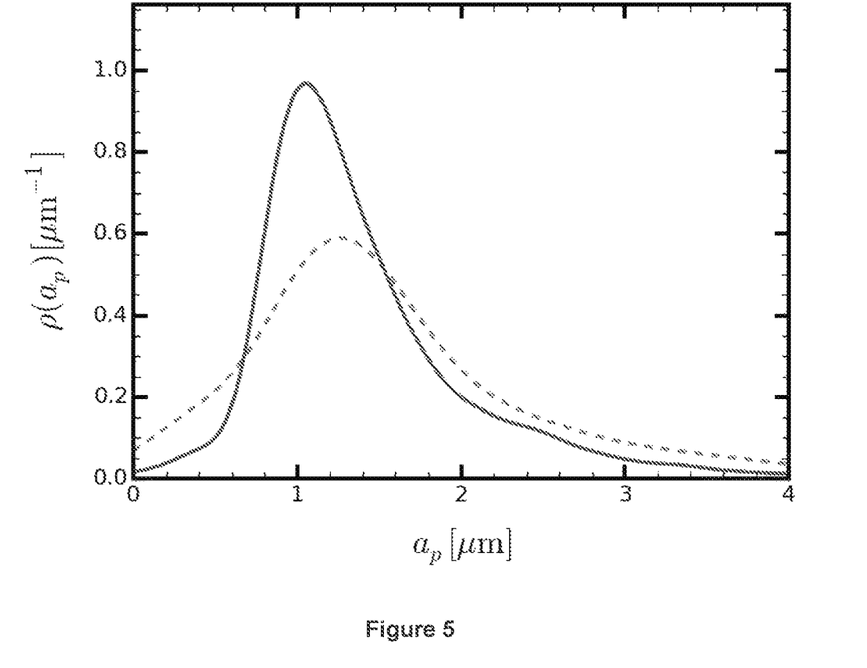
FIG. 5 Holographically measured size distribution of contaminant particles in a thawed sample of frozen slurry. The dashed curve shows results for the same sample after 30 min of sonication.

However, it should be considered that the type of aggregate or contaminant may further matter. For example, transient aggregates may not have deleterious effects under the strong shear forces encountered during polishing that a solid contaminant of like-size would have. To investigate the nature of the observed aggregates, the thawed slurry was subjected to 30 min of sonication. The dashed curve in FIG. 5 shows the resulting holographically-measured size distribution. Whereas sonication appears to have disrupted the largest aggregates, smaller aggregates with radii ranging up to 1 μm remain intact. These aggregates are small enough that they are not evident under visual inspection, and do not appear in bright-field images. Because they are robust enough to survive sonication, they likely would render the slurry unacceptable for use in polishing. Additional insights into the individual particles' mechanical characteristics may be inferred from their holographically-measured refractive indexes. Porous particles tend to have refractive indexes that are lower than the bulk value by an amount that depends on the particles' porosity. High-index particles in a low-index fluid medium tend to display lower refractive indexes as their porosity increases. Estimates for the porosity, in turn, can be used to assess whether the detected particles are likely to be deleterious to the intended application. Non-deleterious particles, such as dispersed gas bubbles, similarly can be distinguished from damaging solid particles on the basis of their refractive index.

These results demonstrate that holographic characterization can be used to detect and measure the proper-ties of individual contaminant particles in CMP slurries without requiring dilution. The particle-resolve measurements yield estimates for the distribution of contaminant sizes without invoking a priori models for the distribution.

Figure 6:
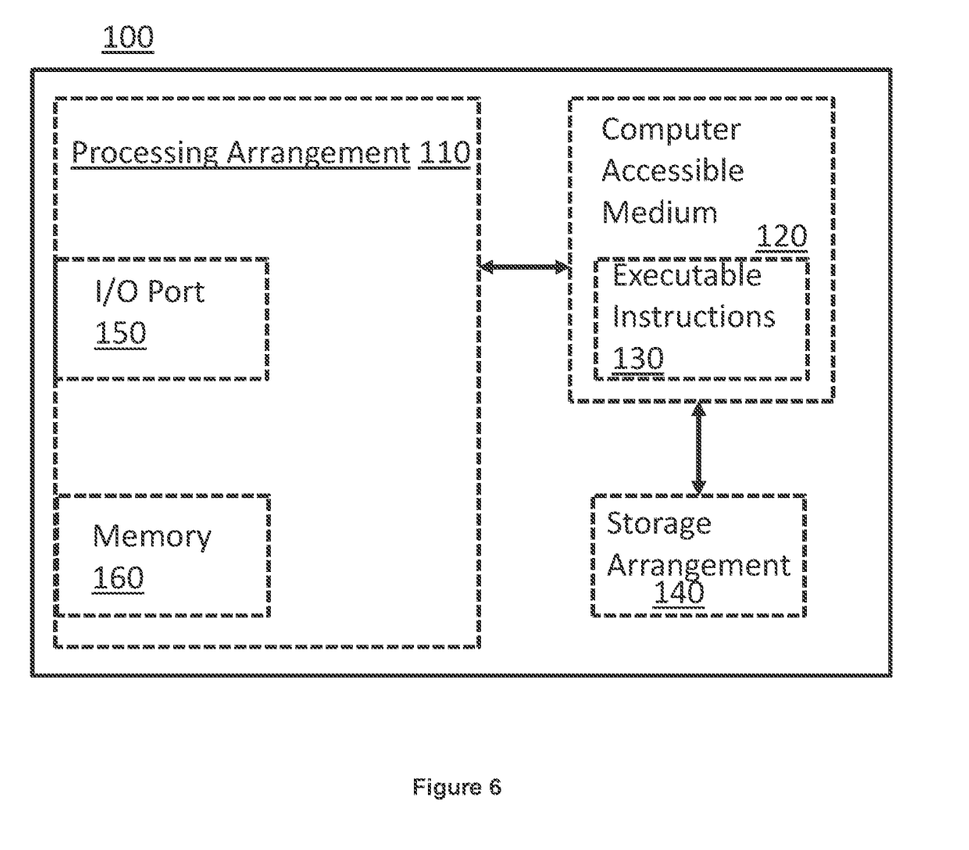
FIG. 6 illustrates a computer system for use with certain implementations.

As shown in FIG. 6, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The instructions may include a plurality of sets of instructions. For example, in some implementations, the instructions may include instructions for applying radio frequency energy in a plurality of sequence blocks to a volume, where each of the sequence blocks includes at least a first stage. The instructions may further include instructions for repeating the first stage successively until magnetization at a beginning of each of the sequence blocks is stable, instructions for concatenating a plurality of imaging segments, which correspond to the plurality of sequence blocks, into a single continuous imaging segment, and instructions for encoding at least one relaxation parameter into the single continuous imaging segment.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. Therefore, the above embodiments should not be taken as limiting the scope of the invention.

What is claimed:

1. A method of characterizing impurities in a sample of a slurry of particles a fluid, comprising:
    flowing the slurry through an observation volume of a holographic microscope;
    generating a first holographic image, by a holographic video microscopy system having a laser, of the sample within the observation volume at a first time;
    analyzing the first holographic image for one or more regions of interest corresponding to a particle of interest;
    normalizing the region of interest for a contribution of a diffuse wave created by interaction of the laser with the slurry;
    fitting the normalized region of interest to a light scattering theory; and
    characterizing, based upon the fitting of the normalized region of interest, one or more properties of particle of interest;
    wherein a depth of the observation volume is less than the attenuation depth of the laser in the slurry.

2. The method of claim 1, wherein the slurry comprises particles of 200 nm or less size.

3. The method of claim 2, wherein the particle of interest has a size of about 200 nanometers to about 20 micrometers.

4. The method of claim 1, wherein the peak flow is about 100 micrometers per second.

5. The method of claim 1, further comprising selecting a sample cell of depth D.

6. The method of claim 1, wherein characterizing the one or more particles of interest comprises determining radius and refractive index.

7. A method of characterizing particles of interest in a slurry, comprising:
flowing the slurry through an observation volume of a holographic microscope, the slurry comprising slurry particles in a fluid and particles of interest;
interacting a laser beam with a sample of the slurry and generating a first holographic image based upon holographic video microscopy of the sample within the observation volume at a first time, the first holographic image recording a light field from a scattered wave, generated by interaction of the laser beam with a particle of the particles of interest, and a diffuse wave, generated by interaction of the laser beam and the scattered wave with the slurry particles;
quantifying a contribution of the diffuse wave to the first holographic image;
applying Lorenz Mie analysis to the first holographic image; and
characterizing, based upon the Lorenz Mie analysis, the particle of the particles of interest.

8. The method of claim 7, wherein the slurry comprises particles of 200 nm or less size.

9. The method of claim 8, wherein the particle of interest has a size of about 200 nanometers to about 20 micrometers.

10. The method of claim 7, wherein the peak flow is about 100 micrometers per second.

11. The method of claim 7, further comprising selecting a sample cell of depth D.

12. The method of claim 7, wherein characterizing the particle of interest comprises determining radius and refractive index.

13. The method of claim 7, further comprising, after quantifying the contribution, normalizing the region of interest for the contribution of the diffuse wave.

* * * * *

UNITED STATES PATENT AND TRADEMARK OFFICE
CERTIFICATE OF CORRECTION

PATENT NO. : 10,641,696 B2
APPLICATION NO. : 15/759502
DATED : May 5, 2020
INVENTOR(S) : David B. Ruffner, David G. Grier and Laura Philips It is certified that error appears in the above-identified patent and that said Letters Patent is hereby corrected as shown below:

In the Specification

Column 1, following after the "Cross Reference to Related Applications" sub-heading and paragraph, add new sub-heading and paragraph:
"STATEMENT OF GOVERNMENT INTEREST
This invention was made with government support under grant number 1519057 awarded by the National Science Foundation. The government has certain rights in the invention."

Signed and Sealed this
Fifteenth Day of April, 2025

Coke Morgan Stewart
*Acting Director of the United States Patent and Trademark Office*